(12) United States Patent
Nelson et al.

(10) Patent No.: US 7,245,030 B2
(45) Date of Patent: Jul. 17, 2007

(54) INTEGRATED GENERATOR AND TRANSFORMER AND ASSOCIATED METHODS

(75) Inventors: Robert J. Nelson, Orlando, FL (US); Stephen W. Cates, Oviedo, FL (US)

(73) Assignee: Siemens Power Generation, Inc., Orlando, FL (US)

( * ) Notice: Subject to any disclaimer, the term of this patent is extended or adjusted under 35 U.S.C. 154(b) by 95 days.

(21) Appl. No.: 10/733,739

(22) Filed: Dec. 11, 2003

(65) Prior Publication Data

US 2005/0127674 A1    Jun. 16, 2005

(51) Int. Cl.
F02B 43/08 (2006.01)
F02B 65/00 (2006.01)
B60L 1/02 (2006.01)
F01K 15/00 (2006.01)
B61D 43/00 (2006.01)

(52) U.S. Cl. ............ 290/1 A; 290/4 C; 290/40 A
(58) Field of Classification Search ........ 290/1 A, 290/4 C, 40 A
See application file for complete search history.

(56) References Cited

U.S. PATENT DOCUMENTS

| | | | | |
|---|---|---|---|---|
| 2,548,566 | A | | 4/1951 | Stafford ............ 174/95 |
| 2,944,101 | A | | 7/1960 | Albright ........... 174/99 B |
| 2,953,720 | A | * | 9/1960 | Engel ............... 315/209 M |
| 3,333,329 | A | * | 8/1967 | Linkous ............ 29/596 |
| 4,035,659 | A | * | 7/1977 | Jeppson ............ 307/84 |
| 4,052,858 | A | * | 10/1977 | Jeppson ............ 60/648 |
| 4,117,342 | A | * | 9/1978 | Melley, Jr. ........ 290/1 A |
| 4,136,432 | A | * | 1/1979 | Melley, Jr. ........ 29/469 |
| 4,302,291 | A | * | 11/1981 | Severs et al. ...... 376/293 |
| 4,866,316 | A | | 9/1989 | Humphries et al. .. 310/71 |
| 5,153,567 | A | * | 10/1992 | Chimento .......... 340/691.5 |
| 5,848,651 | A | * | 12/1998 | McSheffrey et al. .. 169/51 |
| 5,975,475 | A | * | 11/1999 | Chaplin ............ 248/311.2 |
| 6,274,941 | B1 | * | 8/2001 | Ryhiner ............ 290/40 A |
| 6,302,218 | B1 | * | 10/2001 | McSheffrey et al. .. 169/51 |
| 6,311,779 | B2 | * | 11/2001 | McSheffrey et al. .. 169/23 |
| 6,376,775 | B1 | | 4/2002 | Leijon et al. ...... 174/128.1 |
| 6,448,685 | B1 | | 9/2002 | Mayer et al. ...... 310/254 |
| 6,456,021 | B1 | | 9/2002 | McLaren et al. ... 318/146 |
| 6,492,740 | B2 | * | 12/2002 | Suzuki ............. 290/1 A |
| 6,525,265 | B1 | | 2/2003 | Leijon et al. ...... 174/15.5 |
| 6,532,398 | B2 | * | 3/2003 | Matsumoto ........ 700/213 |
| 6,608,392 | B2 | * | 8/2003 | Matsumoto ........ 290/1 A |
| 6,641,286 | B2 | * | 11/2003 | Hincher, Sr. ....... 362/253 |
| 6,765,304 | B2 | * | 7/2004 | Baten et al. ....... 290/1 A |
| 6,815,840 | B1 | * | 11/2004 | Aldendeshe ....... 290/1 R |
| 6,849,961 | B2 | * | 2/2005 | Takizawa et al. ... 290/1 A |

(Continued)

OTHER PUBLICATIONS http://dictionary.reference.com/search?q=transformer.*

(Continued)

*Primary Examiner*—Darren Schuberg
*Assistant Examiner*—Pedro J. Cuevas

(57) ABSTRACT

An electrical power generating apparatus (20) may include a housing (22), an electrical generator (24) within the housing, and a step-up transformer (30) within the housing and connected to the electrical generator. A turbine (26) may be provided exterior the housing (22) to drive the electrical generator (24). A barrier wall (38) may be provided within the housing and (22) between the electrical generator (24) and the step-up transformer (30), and a fire extinguishing system (40) may be installed within the housing (22). The step-up transformer (30) may be connected to the electrical generator (24) without use of an isolated phase bus.

18 Claims, 2 Drawing Sheets

U.S. PATENT DOCUMENTS

| | | | |
|---|---|---|---|
| 6,876,096 B2* | 4/2005 | Du Plessis et al. | 290/4 C |
| 6,895,903 B2* | 5/2005 | Campion | 123/2 |
| 7,081,682 B2* | 7/2006 | Campion | 290/1 A |
| 7,122,913 B2* | 10/2006 | Witten et al. | 290/1 A |

OTHER PUBLICATIONS http://farside.ph.utexas.edu/teaching/em1/lectures/node38.html.*
http://hyperphysics.phy-astr.gsu.edu/hbase/magnetic/transf.html.*

* cited by examiner

INTEGRATED GENERATOR AND TRANSFORMER AND ASSOCIATED METHODS

FIELD OF THE INVENTION

The present invention relates to the field of power generation and, more particularly, to a power generating apparatus and related methods.

BACKGROUND OF THE INVENTION

An electrical power generation apparatus may comprise an electrical generator that is driven by a turbine, for example. The electrical generator converts mechanical energy into electrical energy. A typical electrical generator includes a stator, and a rotor that rotates within the stator to generate electricity. The rotor is driven by a shaft to which it is mounted.

An isolated phase bus is commonly used to connect a step-up transformer to an electric generator. An example of such an isolated phase bus is disclosed in U.S. Pat. No. 2,548,566 to Stafford, for example. The isolated phase bus comprises a plurality of bus bars in an enclosure. The isolated phase bus connects an electrical generator to a plurality of transformers and is mounted to a plurality of H-beam supports by support rings.

U.S. Pat. No. 2,944,101 to Albright discloses a metal enclosed high voltage bus structure. The bus is suitable for supporting voltages of the order of 138 KV. The bus structure comprises flexible rolled sheet metal. To provide rigidity sufficient for mounting to supports, circular reinforcing members are fastened to the outside of the housing.

A problem associated with the above referenced configurations, however, is that they may require a large footprint, which may increase design costs, as well as overall plant costs. Further, the isolated phase bus may be cumbersome. Once the isolated phase bus is installed, maneuverability about the site may be difficult.

A product distributed by ABB under the commercial name of Powerformer™ is a high voltage generator using solid dielectric high voltage cables for stator windings. The high voltage cables can be connected directly to a transmission system. More specifically, the Powerformer™ uses underground cable technology (with Class A insulation, as understood by those skilled in the art) for stator windings. Low insulation temperatures, however, generally correspond to large size and/or low efficiency operation. Further, the Powerformer™ is generally custom designed for a given transmission voltage.

SUMMARY OF THE INVENTION

In view of the foregoing background, it is therefore an object of the present invention to provide a power generating apparatus that eliminates the need for an isolated phase bus and that occupies a smaller footprint on a power plant site.

These and other objects, features, and advantages of the present invention are provided by an electrical power generating apparatus that may comprise a housing, an electrical generator within the housing, and a turbine for driving the electrical generator. The electrical power generating apparatus may further comprise a step-up transformer within the housing and connected to the electrical generator. The electrical generator and the step-up transformer being within a housing is advantageous because it occupies a smaller footprint, and eliminates the need for an isolated phase bus.

The electrical power generating apparatus may comprise a plurality of insulated copper conductors connecting the electrical generator and the step-up transformer, and the electrical generator may have at least a 50-megawatt output. A barrier wall may be included within the housing and between the electrical generator and the step-up transformer. Further, the housing may comprise at least one access door. The electrical power generating apparatus may also comprise a fire extinguishing system within the housing.

The step-up transformer may have an output voltage of one of at least 69 KV. The turbine may comprise a gas turbine, a steam turbine, for example.

The electrical power generating apparatus may comprise an output between the electrical generator and the step-up transformer for providing station power. In other embodiments, the step-up transformer may comprise a station power tap for providing station power.

A method aspect of the present invention is for making an electrical power generating apparatus. The method may comprise positioning an electrical generator within a housing, and connecting a step-up transformer to the electrical generator within the housing. The step-up transformer may advantageously be connected to the electrical generator without use of an isolated phase bus.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime notation is used to indicate similar elements in alternate embodiments.

Figure 1:
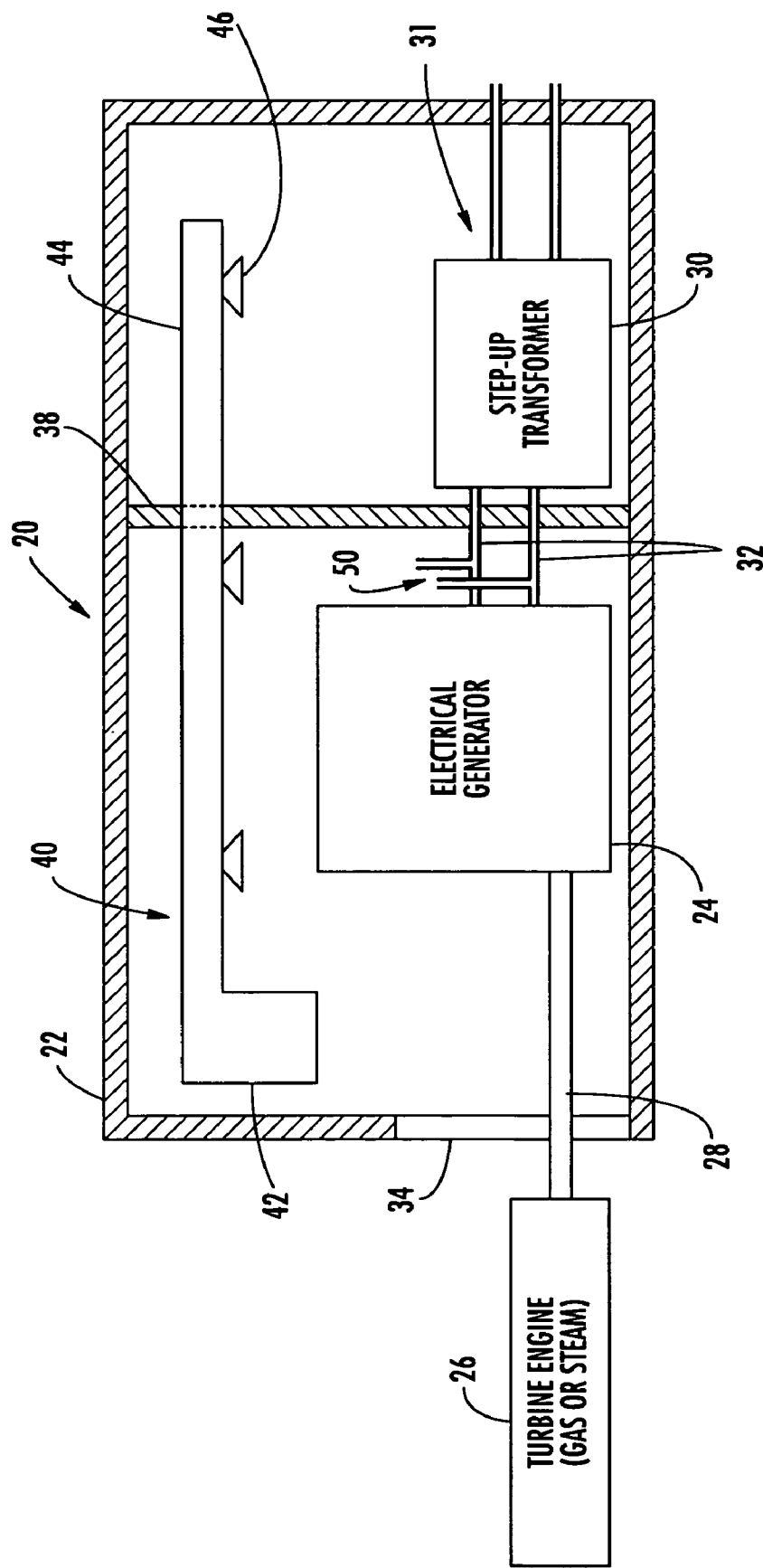
FIG. 1 is schematic view of an electrical power generating apparatus according to the present invention.

Referring initially to FIG. 1, an electrical power generating apparatus 20 according to the present invention is now described. The electrical power generating apparatus 20 includes a housing 22, and an electrical generator 24 within the housing. The housing 22 may, for example, be constructed of metal or concrete, for example, or another a similar durable material, as understood by those skilled in the art.

The electrical power generating apparatus 20 also includes a turbine 26 for driving the electrical generator 24. The turbine 26 is illustratively positioned exterior the housing 22 and comprises a shaft 28 connected to the generator 24. The turbine 26 may be a gas turbine, or a steam turbine, for example, as understood by those skilled in the art.

The electrical power generating apparatus 20 also illustratively comprises a step-up transformer 30 within the housing 22 and connected to the electrical generator 24. A plurality of conductors 32 are used to connect the electrical generator 24 to the step-up transformer 30. The conductors 32 are preferably insulated copper conductors, but may also another type of conductor suitable for connecting the electrical generator 24 to the step-up transformer 30, as understood by those skilled in the art.

The electrical generator 24 preferably has at least a 50-megawatt output, but those skilled in the art will appreciate that the electrical generator may have an output of 200-megawatts, or greater. Various types of oils may be used in the step-up transformer 30, some of which may be flammable. Accordingly, a barrier wall 38 may be included within the housing 22 and between the electrical generator 24 and the step-up transformer 30 to isolate the step-up transformer in case of a fire. The barrier wall 38 may be made of metal or concrete, for example, or another type of material suitable for isolating the step-up generator 30 within the housing 22. The housing 22 may also comprise at least one access door 34. The access door 34 is preferably lockable to restrict access to the housing 22.

The electrical power generating apparatus 20 also illustratively comprises a fire extinguishing system 40 within the housing 22. The fire extinguishing system 40 may include a reservoir 42 connected to a supply line 44 having a plurality of discharge nozzles 46 connected thereto. The fire extinguishing system 40 is preferably installed along an upper portion of the interior of the housing 22 to be elevated above the electrical generator 24 and the step-up transformer 30. Other configurations of the fire extinguishing system 40 are also contemplated by the present invention, however, as understood by those skilled in the art.

The step-up transformer 30 illustratively includes a transformer output 31. The transformer output 31 may have an output voltage of one of 115 KV, 138 KV, 161 KV, and 230 KV to readily accommodate a range of voltages, as desired. More specifically, the transformer output 31 preferably has an output voltage of 69 KV or higher. The electrical power generating apparatus 20 illustratively includes a station power output 50 between the electrical generator 24 and the step-up transformer 30 for providing station power. The station power output 50 may be a plurality of conductors, for example, that are connected to the conductors 32 used to connect the electrical generator 24 to the step-up transformer 30.

The electrical power generating apparatus 20 advantageously eliminates the need for an isolated phase bus to connect the electrical generator 24 and the step-up transformer 30. Due to the elimination of the isolated phase bus, the footprint typically necessary for an electrical generator and step-up transformer is reduced. Furthermore, design time of a power plant is advantageously decreased, as well as design cost. Construction costs associated with an isolated phase bus are advantageously eliminated, and the reduced footprint decreases general power plant costs.

Figure 2:
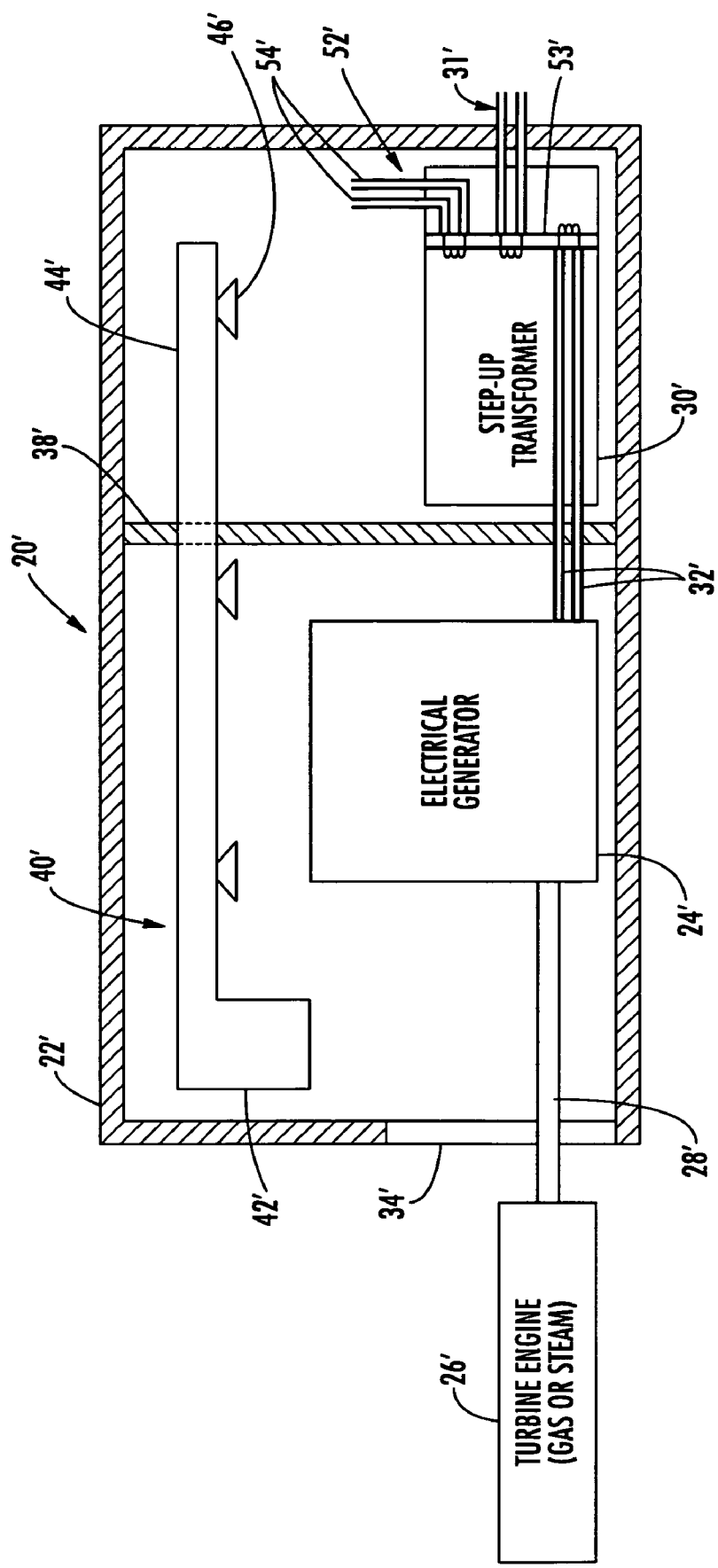
FIG. 2 is a schematic view of another embodiment of the electrical power generating apparatus according to the present invention.

Turning now additionally to FIG. 2, another embodiment of the electrical power generating apparatus 20' is now described. In the second embodiment of the electrical power generating apparatus 20', the step-up transformer 30' illustratively includes a station power tap 52' for providing station power. The station power tap 52' is provided by a plurality of conductors 54' that are illustratively connected to a core 53' within the step-up transformer 30', but may also be another type of tap suitable for providing station power, as understood by those skilled in the art. The other elements of the second embodiment of the power generating apparatus 20' are similar to those of the first embodiment, are labeled with prime notation, are require no further discussion herein.

A method aspect of the present invention is for making an electrical power generating apparatus 20. The method may comprise positioning an electrical generator 24 within a housing 22, and connecting a step-up transformer 30 to the electrical generator within the housing. The step-up transformer 30 may advantageously be connected to the electrical generator 24 without use of an isolated phase bus.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. An electrical power generating apparatus comprising:
a housing;
an electrical generator within said housing;
a turbine for driving said electrical generator;
an alternating current (AC) step-up transformer within said housing and connected to said electrical generator;
a barrier wall within said housing and between said electrical generator and said AC step-up transformer; and
a fire extinguishing system within said housing.

2. An electrical power generating apparatus according to claim 1 further comprising a plurality of insulated copper conductors connecting said electrical generator and said AC step-up transformer.

3. An electrical power generating apparatus according to claim 1 wherein said electrical generator has at least a 50-megawatt output.

4. An electrical power generating apparatus according to claim 1 wherein said housing comprises at least one access door.

5. An electrical power generating apparatus according to claim 1 wherein said AC step-up transformer has an output voltage of at least 69 KV.

6. An electrical power generating apparatus according to claim 1 wherein said turbine comprises a gas turbine.

7. An electrical power generating apparatus according to claim 1 wherein said turbine comprises a steam turbine.

8. An electrical power generating apparatus according to claim 1 further comprising a station power output between said electrical generator and said AC step-up transformer for providing station power.

9. An electrical power generating apparatus according to claim 1 wherein said AC step-up transformer comprises a station power tap for providing station power.

10. An electrical power generating apparatus comprising:
a housing;
an electrical generator within said housing and having an output of at least about 50-megawatts;
an alternating current (AC) step-up transformer within said housing and connected to said electrical generator;
a barrier wall within said housing and between said electrical generator and said AC step-up transformer; and
a fire extinguishing system within said housing.

11. An electrical power generating apparatus according to claim 10 further comprising a plurality of insulated copper conductors connecting said electrical generator and said AC step-up transformer.

12. An electrical power generating apparatus according to claim 10 wherein said housing comprises at least one access door.

13. A method for making an electrical power generating apparatus, the method comprising:

positioning an electrical generator within a housing;
connecting an alternating current (AC) step-up transformer to the electrical generator within the housing;
positioning a barrier wall within the housing between the electrical generator arid the AC step-up transformer; and
positioning a fire extinguishing system within the housing.

14. A method according to claim 13 wherein connecting the AC step-up transformer further comprises connecting the AC step-up transformer without using an isolated phase bus.

15. A method according to claim 13 wherein connecting the AC step-up transformer further comprises using a plurality of insulated copper conductors to connect the electrical generator and the AC step-up transformer.

16. A method according to claim 13 wherein the electrical generator has at least a 50-megawatt output.

17. A method according to claim 13 further comprising installing a station power output between the electrical generator and the AC step-up transformer for providing station power.

18. A method according to claim 13 wherein the AC step-up transformer comprises a station power tap for providing station power.

* * * * *